Jan. 6, 1959

H. E. BROWN 2,867,268

METERING VALVE

Filed Nov. 23, 1954

INVENTOR
HOWARD E. BROWN
BY
ATTORNEYS

Jan. 6, 1959    H. E. BROWN    2,867,268
METERING VALVE
Filed Nov. 23, 1954    3 Sheets-Sheet 2

INVENTOR
HOWARD E. BROWN
ATTORNEYS

Jan. 6, 1959     H. E. BROWN     2,867,268
METERING VALVE

Filed Nov. 23, 1954     3 Sheets-Sheet 3

HOWARD E. BROWN
INVENTOR.

United States Patent Office 2,867,268
Patented Jan. 6, 1959

2,867,268
METERING VALVE

Howard E. Brown, Austin, Tex., assignor to the United States of America as represented by the Secretary of the Navy Application November 23, 1954, Serial No. 470,839

7 Claims. (Cl. 158—36)

The present invention relates to fuel control apparatus for aerial vehicles. In more detail, it relates to a fuel meter for maintaining a selected constant fuel-to-air ratio for a liquid fuel supersonic ramjet engine despite variations in mass air flow due to varying velocity and altitude conditions.

Basically, a supersonic ramjet engine comprises an inlet diffuser, a combustor, an exit nozzle and a fuel supply system. The inlet diffuser accepts air at supersonic speed and converts it to a subsonic speed at increased pressure. The combustor consists of a combustion chamber, a flameholder, a fuel injector and a means for igniting the fuel-air mixture.

A ramjet engine must be propelled to high speed by an auxiliary motor and normal engine operation occurs at supersonic airspeeds. For proper operation of the engine the ratio of fuel-to-air flow must be carefully controlled in order to maintain smooth combustion and to conserve fuel. The proper fuel-air ratio must be maintained over a wide range of airspeeds and atmospheric pressures. Fuel flow control has been one of the greatest problems in ramjet development.

Therefore, it is an object of the present invention to provide a fuel meter for use in an aerial vehicle which will maintain a selected constant fuel-to-air ratio despite varying flight conditions.

Another object of the invention is to provide a simple and compact fuel meter that will maintain a substantially constant fuel-to-air ratio over a range of velocities and altitudes.

It is a more specific object of the present invention to provide a fuel meter that utilizes an empirically derived relationship between fuel and air mass expressed in terms of stagnation and atmospheric pressures to maintain a constant fuel-to-air ratio, the pressures being provided by suitable pressure pickups.

Still another object is the provision of a fuel meter for a ramjet which includes means for compensating for changes in mass air flow due to changes in altitude.

Other objects and many of the attendant advantages of this invention will be appreciated readily as the same becomes better understood by reference to the following detailed description when considered in connection with the accompanying drawings, wherein.

Briefly, the present invention comprises a fuel meter for a ramjet engine which is adapted to be connected in the fuel line between the fuel tank and the fuel injection jets. The fuel meter is shaped to fit the annular space provided between the duct of the engine and the outside shell of the ramjet. To maintain a constant fuel-to-air ratio, obviously the fuel mass flow must vary in proportion to the air mass flow. As will later appear in detail, the air mass flow, and the variations therein due to changes in velocity and altitude, can be determined by measurement of the air stagnation pressure and the air static pressure. Constant air/fuel mixture is maintained by means of the present valve which varies the fuel flow in accordance with changes in the air static and air stagnation pressures.

The valve includes two series connected valves the first of which is arranged to control the fuel pressure across the orifice of the second valve as a function of stagnation and atmospheric pressure. In the second valve the flow area of the orifice is controlled as a function of atmospheric pressure. The combination provided thereby enables the fuel mass flow to be controlled in close proportion to the air mass flow.

Figure 1:
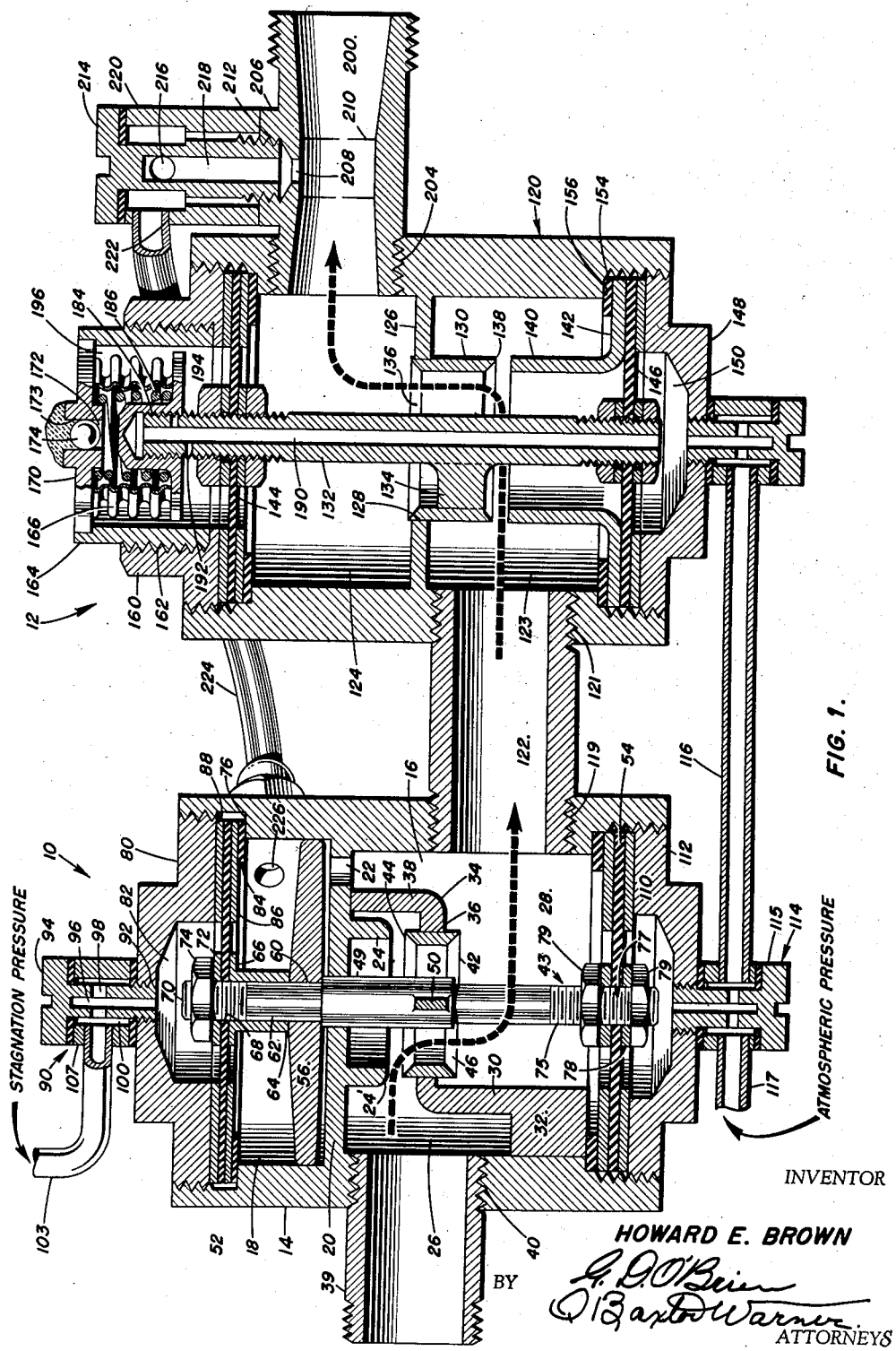
Fig. 1 is a section through the preferred embodiment of a fuel meter according to the present invention.

Referring to Fig. 1 of the drawings, the fuel meter of the present invention is shown as including two valves 10 and 12 connected in series. The first of these, valve 10, comprises a cylindrical housing 14 closed at its upper and lower ends. The housing 14 is divided into two chambers, 16 and 18, by a horizontally extending partition 20 having an aperture 22 therein to permit communication between said chambers. An annular ridge 24 is formed on the underside of partition 20 and is provided with a curved surface 24' which serves as a valve seat as will be explained hereinafter. The chamber 16 is itself further subdivided into an inlet section 26 and an outlet section 28 by a baffle 30. The baffle 30 comprises a down-turned portion 32 attached to the inside surface of housing 14 near the lower end thereof, a horizontally extending portion 34 provided with an aperture 36, and an upturned portion 38 attached to the underside of partition 20 near the aperture 22. A fuel inlet pipe 39 is received in a threaded aperture 40 provided in the housing 14.

A cylindrical valve element 42, attached to a valve stem 43, is slidably mounted in the aperture 36. The valve element 42 is provided with beveled upper and lower edges 44 and 46, the upper edge 44 cooperating with the curved surface 24' of the annular ridge 24 to control the flow of fuel through the valve 10. The cylindrical valve element 42 is carried on an enlarged portion 49 of valve stem 43 by spokes 50 which may be made integral with the stem and the valve element. As will be seen hereinafter, the valve element 42 is actuated by the forces applied to an upper flexible diaphragm 52, a lower flexible diaphragm 54, and a piston 56, all of which are also attached to the valve stem 43. Stagnation pressure $P_m$ and atmospheric pressure $P_o$ are applied to the upper and lower diaphragms, respectively, and the piston is loaded with the pressure at the inlet to valve 12 and a pressure proportional to the outlet pressure of valve 12. The valve element 42 therefore assumes a position determined by the balance of these forces.

The piston 56 and the flexible diaphragms 52 and 54 may be attached to the valve stem 43 by any conventional means. In the embodiment of the invention shown in Fig. 1, the piston is provided with a central aperture 60 which snugly receives the upper portion 62 of the valve stem 43 and is arranged to slide vertically in the chamber 18. For attaching the central portion of the upper flexible diaphragm 52 to the upper end of the valve stem 43, a sleeve 64 having a flange 66 on its upper end is carried on the valve stem and is interposed between said diaphragm 52 and the piston 56, and a central aperture 68 is provided in diaphragm 52 through which a threaded portion 70 of valve stem 43 extends. A washer 72 and a nut 74 retain the central portion of the upper diaphragm 52 on the valve stem in abutting relationship with the flange 66. To connect the central portion of the lower diaphragm 54 to the stem 43, the lower threaded end portion 75 of stem 43 extends through an aperture 77 in said diaphragm and the diaphragm is held between washers 78 which are backed up by nuts 79 threaded onto the stem.

The cylindrical housing 14 has an enlarged, threaded, internal section near its upper end terminating in a shoulder 76. A sealing gasket 84 is held in abutting relationship with the shoulder 76 by a ring 86 and the outer edge of diaphragm 52 is retained between the ring 86 and a second ring 88 by a top cap 80. The top cap 80 is screwed onto the upper end of the cylindrical housing 14, a threaded portion of said cap being received in the internally threaded section of the housing.

A recess 82 is formed in the top cap 80 and cooperates with the upper flexible diaphragm 52 to form a chamber, and an inlet connection generally indicated by reference numeral 90 is provided for admitting air under stagnation pressure to the chamber thus formed. The inlet connection 90 includes a screw 94, received in a threaded hole 92 provided in the top cap 80, a vertically extending passageway 96, and a horizontally extending passageway 98. The passageways in screw 94 communicate with a passageway 100 provided in a T coupling 107 to which a Pitot tube 103 is connected. The Pitot tube 103 serves as a stagnation pressure pickup.

The lower flexible diaphragm 54 is retained on the lower end of housing 14 in the same manner as was explained above in connection with the upper flexible diaphragm. The diaphragm 54 and a recess 110 in a bottom cap 112 cooperate to form a chamber to which air under atmospheric pressure is supplied by an inlet connection 114. The inlet connection 114 is the same as inlet connection 90 except that the T 115 is provided with a second aperture to receive a tube 116 for a purpose that will be explained hereinafter. A Pitot tube 117 serves as an atmospheric pressure pickup.

The second valve 12 of the fuel meter similarly comprises a cylindrical housing 120 closed at its upper and lower ends. A fuel line 122 interconnects the interior of the two housings 14 and 120, one end of the line 122 being received in a threaded opening 119 in the housing 14, and the other being received in a threaded opening 121 in housing 120. The interior of housing 120 is divided into inlet and outlet chambers 123 and 124, respectively, by a partition 126 having a central opening 128 formed therein. A cylindrical valve member 130, attached to a hollow valve stem 132 by spokes 134 formed integrally with the valve member and the stem, is slidably received in the opening in partition 126. The upper and lower edges 136 and 138, respectively, of the cylindrical valve element 130 are beveled in a manner similar to the valve element 42 of valve 10. For controlling the flow between inlet and outlet chambers 123 and 124, respectively, the lower edge 138 of the valve element 130 cooperates with a valve seat 140 provided with a rim 142 for a purpose that will be explained hereinafter.

Adjacent its upper and lower ends the valve stem 132 is attached to the center portions of flexible diaphragms 144 and 146, in a manner similar to that described in the case of lower diaphragm 54 and valve stem 48 of valve 10. In addition, the lower flexible diaphragm 146 is retained on the cylindrical housing 120 by a bottom cap 148 in the same general manner as described in the case of the flexible diaphragm 52. A recess 150 in the bottom cap 148 cooperates with the diaphragm 146 to form a chamber for containing air at atmospheric pressure, the air being admitted by an inlet connection similar to inlet connection 90 and to which the tube 116 is attached. It is pointed out that the rim 142 on the lower end of valve seat 140 serves to retain a sealing gasket 154 against a shoulder 156 formed on the inside of housing 120.

The outer edge of upper flexible diaphragm 144 is retained between washers provided adjacent the upper end of housing 120 by a top cap 160 screwed onto the housing, in the same manner as the other diaphragms. The top cap 160 has a threaded recess 162 for receiving a cylindrical housing 164 which carries an aneroid comprising an evacuated bellows 166 attached at one end to a plate 170 that is a part of housing 164. The plate 170 is provided with a cylindrical aperture 172 having a sloping wall 173 and receiving a ball 174. The wall 173 and the ball 174 comprise a check valve for assisting the evacuation of the bellows 166. After evacuation the aperture 172 is filled by solder or wax thereby sealing the bellows.

The bellows 166 has a threaded recess 184 formed in its lower end, in which the threaded upper portion of valve stem 132 is received. The force of air pressure tending to compress the bellows is opposed by a spring 186 carried in the bellows 166, interposed between the plate 170 and the lower end of the bellows. The lower portion of the wall 173 and the wall of recess 184 cooperate to retain the spring 186 in position.

The valve stem 132 has a longitudinally extending passageway 190 and cross passageways 192 and 194 which communicate with a chamber 196 formed by housing 164, top cap 160, and diaphragm 144. By reason of these passageways, the upper surface of diaphragm 144 and the evacuated bellows 168 are exposed to air at atmospheric pressure admitted from the chamber formed by recess 150 and diaphragm 146. The effective valve area of valve 12 therefore varies linearly with atmospheric pressure, the displacement of the valve being opposed by a constant factor introduced by the spring 186.

A venturi 200 having a threaded end portion received in a threaded aperture 204 in the wall of housing 120 completes that part of the fuel meter which provides an effective valve area which varies with changes in atmospheric pressure. The venturi has a projection 206 on its outside surface and an aperture 208 extends therethrough in communication with the internal cylindrical section 210 of the venturi. The aperture 208 has a threaded counter-bore 212 for receiving a screw 214 provided with passageways 216 and 218 which communicate with the interior of a sleeve 220. The sleeve 220 is provided with an aperture 222 receiving one end of a tube 224 which has its other end inserted in an aperture 226 in the cylindrical housing 14 of valve unit 10. The metered fuel flows from the venturi 200 to a fuel line described hereinafter in connection with Fig. 3.

Figure 2:
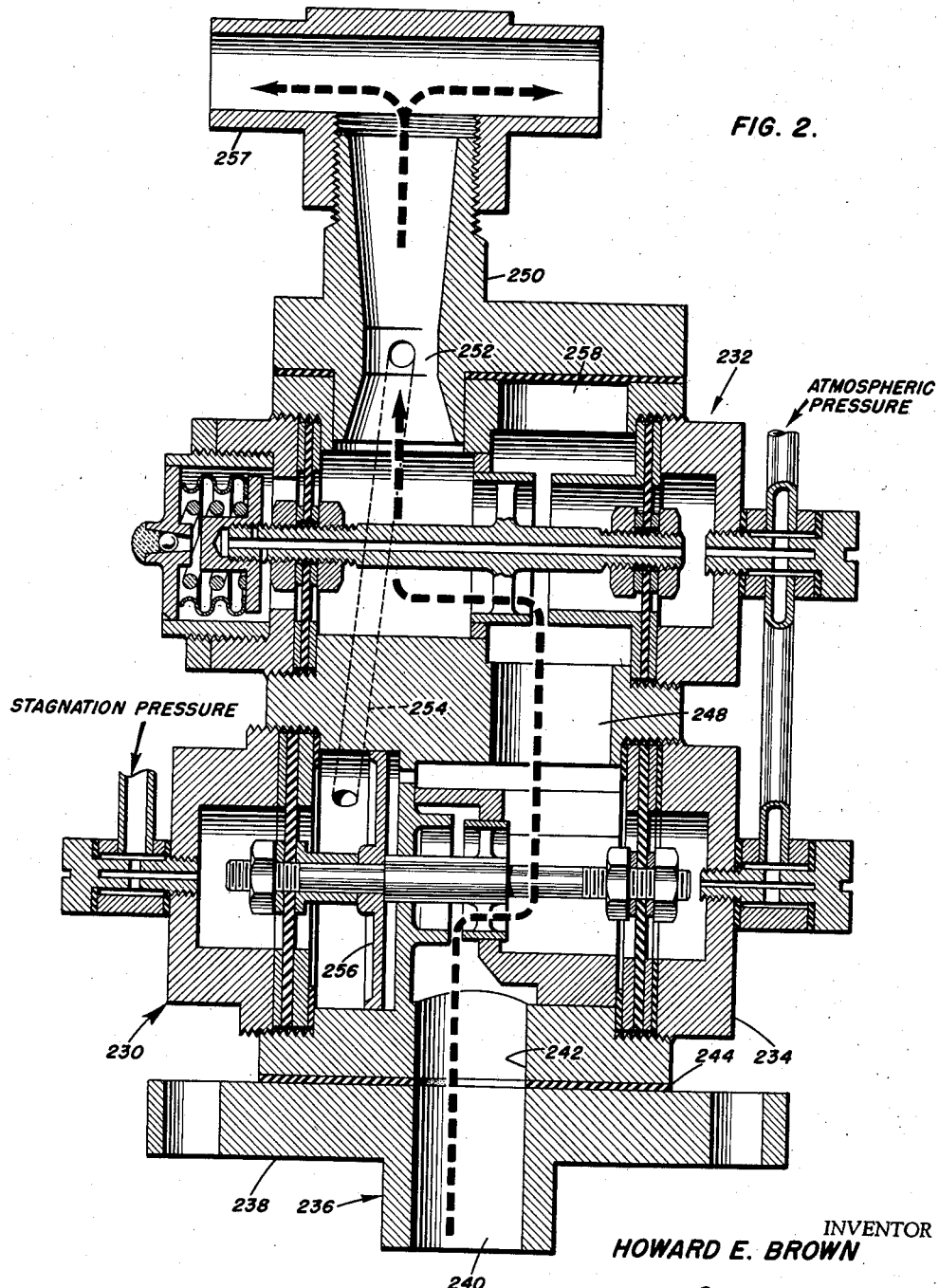
Fig. 2 is a section through a modification of the fuel meter.

The embodiment of the invention shown in Fig. 2 eliminates the separate housings for the two valves of the fuel meter, the threaded connection between the housings, and the threaded inlet and outlet connections to the valve body. Otherwise, the two embodiments of the invention are substantially identical, each element described in connection with the embodiment of Fig. 1, having its equivalent in the embodiment of Fig. 2. Thus, in the embodiment of Fig. 2, two valves 230 and 232 are arranged in series in a valve block 234, in which the valve chambers and passages described in connection with Fig. 1 are provided. An inlet connection 236 provided with a mounting flange 238 is adapted to be held by any convenient means in abutting relationship with one side of valve block 234 so that the opening 240 in the inlet connection is aligned with the inlet passageway 242 in the valve block. A gasket 244 is interposed between the inlet connection and the valve block.

The two valves 230 and 232 are interconnected by a passageway 248. A venturied coupling 250 is arranged to be attached to the output side of the valve unit 232, the venturi communicating with the interior of said valve unit.

A passageway 254, shown in dotted lines, interconnects the cylindrical portion 252 of the passageway in coupling 250 and the chamber formed above the piston 256 of valve unit 230. The metered fuel flows through a T-shaped coupling 257 screwed on the outer end of the coupling 250 to a fuel line to be described in connection with Fig. 3. A hole 258 formed in the side of the valve block 234 is provided for manufacturing purposes only.

In the operation of both of the embodiments of the fuel meter, the flow of fuel is through the first valve, the interconnecting passageway between two valves, the second valve, and the venturi, into the fuel line. The upper diaphragm of the first valve has stagnation pressure applied thereto from the Pitot tube 103. The lower diaphragms of both valve units and the upper diaphragm of the second valve unit all have atmospheric pressure applied to one face thereof as described hereinabove. Also, the piston of the first valve unit has the combined pressure drop occurring across the second valve and the venturi applied thereto. Thus, the valve member 42 of the first valve assumes a position determined by the balance of these forces.

The valve element 130 is balanced by the application of atmospheric pressure to the upper surface of the upper diaphragm and the lower surface of the lower diaphragm. Since atmospheric pressure also acts on the bellows 166, the valve element 130 will assume a position as a function of atmospheric pressure.

The valve operation may be understood by consideration of the following analysis:

The air mass flow per unit intake area is given by $$\text{Air Mass} = \rho_0 U_0 \quad (1)$$

where
$\rho_0$ is the ambient air density; and
$U_0$ is the velocity of the air stream.

In the case of an incompressible fluid, Bernoulli's equation states the following relationship between atmospheric pressure $P_0$, stagnation pressure $P_m$ and velocity $U_0$:

$$P_m - P_0 = \tfrac{1}{2} \rho_0 U_0^2 \quad (2)$$

Solving Equation 2 for $U_0$, the following is obtained:

$$U_0 = \sqrt{\frac{2(P_m - P_0)}{\rho_0}} \quad (3)$$

Substituting the above value of $U_0$ in Equation 1

$$\text{Air Mass} = \rho_0 \sqrt{\frac{2(P_m - P_0)}{\rho_0}} \quad (4)$$

As indicated in NACA report No. 218, "Standard Atmosphere, Tables and Data," the ambient air density $\rho_0$ may be expressed in terms of ambient pressure, sea level pressure and sea level density as follows:

$$\rho_0 = \rho_g \left( \frac{P_0}{P_g} \right)^{\frac{1}{\eta}} \quad (5)$$

where
$\eta$ is the polytropic exponent equal to 1.235;
$\rho_g$ is the standard sea level density; and
$P_g$ is the standard sea level pressure.

Taking $$\frac{\rho_g}{P_g^{\frac{1}{\eta}}} = C_1$$

a constant and substituting the value for $\rho_0$ obtained thus from Equation 5 in Equation 4, is follows that $$\text{Air Mass} = \rho_0 U_0 = C_1 \sqrt{P_m - P_0} \cdot P_0^{\frac{1}{2\eta}}$$
$$= C_1 \sqrt{P_m - P_0} \cdot P_0^{.405} \quad (6)$$

If the fuel rate is varied in accordance with Equation 6, a constant proportion of fuel to air can be maintained.

Therefore, $$\text{Fuel Mass} = w_f = C_2 \sqrt{P_m - P_0} \cdot P_0^{.405} \quad (7)$$

where
$C_2$ is a constant equal to $C_1$/air-fuel ratio.

The valve of the present invention control fuel flow substantially in accordance with Equation 7. The metering, while not exact, is nevertheless a close approximation of the required control. As will be shown, the approximation is sufficiently accurate to maintain the air/fuel ratio constant within 5%.

In the pressure regulating section 10 of the valve, the valve, the following forces exist: The forces tending to close the valve are; the atmospheric pressure $P_0$ acting upon the area $A_d$ of the diaphragm 54, the pressure $P_1$ of the fuel in chamber 28 acting upon the area $A_p$ of piston 56, and the pressure $P_2$ of the fuel in the throat 210 of the venturi 200 acting upon the area $A_d$ of diaphragm 68. The forces tending to open the valve are; the pressure $P_1$ acting upon the area $A_d$ of diaphragm 54, the pressure $P_2$ acting upon the area $A_p$ of piston 56, and the stagnation pressure $P_m$ acting upon the area $A_d$ of diaphragm 52.

The opening and closing forces are in equilibrium, hence the following equation may be written:

$$P_0 A_d + P_1 A_p + P_2 A_d = P_1 A_d + P_2 A_p + P_m A_d \quad (8)$$

which may be rearranged as $$\frac{P_m - P_0}{P_1 - P_2} = \frac{A_p - A_d}{A_d} = C_3, \text{ a constant} \quad (9)$$

A conventional formula from hydraulics states that the flow Q of a fluid under a pressure difference $p_1 - p_2$ through an orifice having an area A is $$Q = cA\sqrt{p_1 - p_2} \quad (10)$$

By applying Equation 10 to the flow regulator 12 of the metering valve the following equation is obtained:

$$P_1 - P_2 = C_4 \left( \frac{w_f}{A_1} \right)^2 + C_5 \left( \frac{w_f}{A_2} \right)^2 \quad (11)$$

which may be rearranged as $$w_f = \sqrt{\frac{P_1 - P_2}{\frac{C_4}{A_1^2} + \frac{C_5}{A_2^2}}} \quad (12)$$

where:
$w_f$ is the fuel mass flow,
$A_1$ is the area of the orifice between the lower edge 138 of valve element 130 and the valve seat 140,
$A_2$ is the throat area of venturi 200, and
$C_4$ and $C_5$ are discharge coefficients.

Since $A_2$ remains constant, Equation 12 may be further simplified to read $$w_f = \sqrt{P_1 - P_2} \cdot \frac{C_6 A_1}{\sqrt{1 + \frac{A_1^2}{A_2^2}}} \quad (13)$$

Since $A_1$ is small compared to $A_2$ the term $$\sqrt{1 + \frac{A_1^2}{A_2^2}}$$

approaches unity and therefore Equation 13 may be written reasonably accurately as $$w_f = \sqrt{P_1 - P_2} \cdot C_6 A_1 \quad (14)$$

Recalling from Equation 9 that $$p_1 - p_2 = \frac{P_m - P_0}{C_3}, \text{ therefore } \sqrt{P_1 - P_2} = \frac{\sqrt{P_m - P_0}}{\sqrt{C_3}}$$

and substitution in Equation 14 provides $$w_f = C_7 \sqrt{P_m - P_0} \cdot C_6 A_1 \quad (15)$$
$$\cong C_2 \sqrt{P_m - P_0} \cdot P_0^{.405}$$

Equation 15 expresses the metering function of the valve. Comparison of Equation 15 with Equation 7 reveals that in order for the actual fuel flow to equal the desired fuel flow, $C_6A_1$ must equal $P_0^{.405}$. $A_1$ is a linear function of $P_0$ determined by the spring constant of spring 186. However, for altitudes from sea level to 30,000 feet, $P_0^{.405}$ is very nearly linear, hence the fuel is metered with sufficient accuracy to maintain the air-fuel ratio nearly constant.

Figure 3:
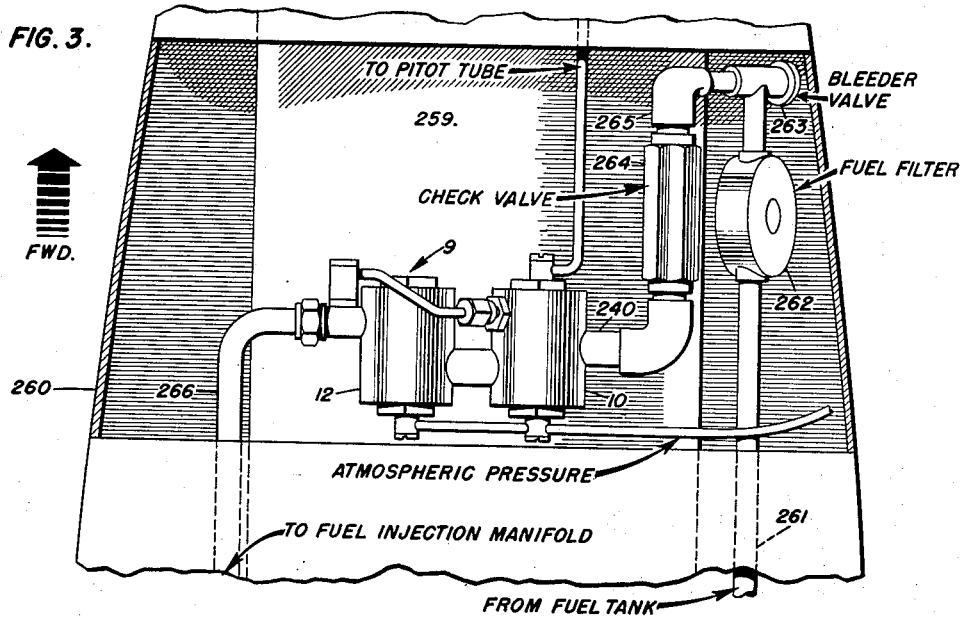
Fig. 3 is an elevation showing the fuel meter of the present invention mounted in an aerial vehicle of the ramjet type.

Fig. 3 shows the fuel meter generally indicated by reference numeral 9 mounted in the annular space between the duct 259 and the outside shell 260 of the ramjet, the whole assembly, including the inlet and output connections being shaped to wrap around said duct. Fuel is conducted through a fuel line 261 from a fuel tank (not shown) to a fuel filter 262. A bleeder valve 263 and a check valve 264 are provided in the fuel line 265, connected to fuel line 261, for supplying fuel to the input side of valve 10. Fuel flows through the valve 10 and the interconnecting fuel line 122 into valve unit 12. The output from the fuel meter 9 is conducted by a fuel line 266 to a fuel injection manifold in the combustion chamber (not shown).

The development of the required fuel flow equation appearing hereinbefore is based upon Bernoulli's equation for incompressible flow. To be exact, the effects of compressibility must enter into the computation of fuel flow.

Figure 4:
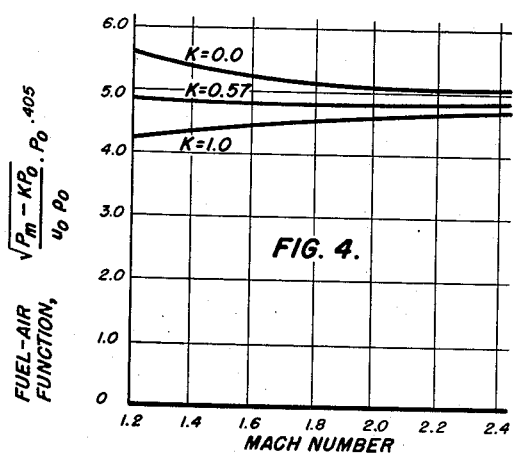
Fig. 4 is a graphic presentation showing the relationship between the fuel-air function of the meter and Mach number.

Fig. 4 illustrates the error inherent in considering the air mass flow as being incompressible rather than compressible. The ordinate units are arbitrary. The criterion for accuracy is the constancy of the fuel-air function for a wide range of Mach numbers. Writing Equation 7 as $$w_f = \sqrt{P_m - KP_0} \cdot P_0^{.405} \qquad (16)$$

and dividing by the actual compressible air mass flow, it can be seen that if the constant $K$ is made equal to 0.57, constant air fuel ratio will be maintained. On the other hand the departure from constancy is not great when the air mass flow is considered to be incompressible, i. e., $K=1$, and therefore the valve of the present invention maintains a sufficiently constant air-fuel ratio.

Figure 5:
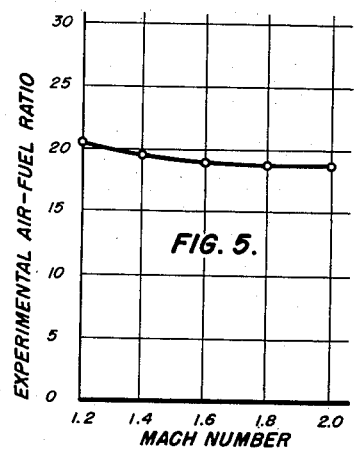
Figs. 5 and 6 are graphic representations of experimentally determined variations of fuel-to-air ratio and Mach number, and fuel-to-air ratio and altitude in feet, respectively, obtained with the present invention.
Figure 6:
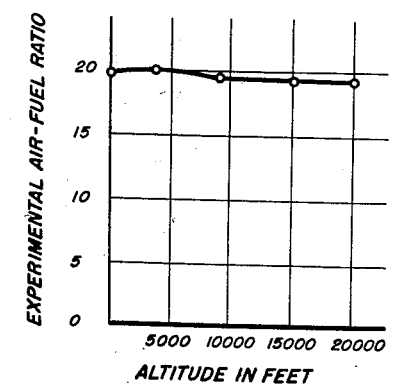

Figs. 5 and 6 show that a relatively constant fuel-to-air ratio is obtained with the fuel meter of the present invention despite varying Mach numbers and altitude. In Fig. 5, the indicated deviation from a fuel-to-air ratio of 20 is less than 5% for altitudes ranging from zero to 20,000 feet. In Fig. 6 it can be seen that the measured fuel-to-air ratio deviates from a design value of 20 by approximately 5% as Mach number varies from 1.2 to 2.0.

Obviously many modifications and variations of the present invention are possible in the light of the above teachings. It is therefore to be understood that within the scope of the appended claims the invention may be practiced otherwise than as specifically described.

What is claimed is:

1. A fuel meter for maintaining a constant fuel-to-air ratio for a ramjet engine comprising, a fuel pressure throttling valve receiving fuel and including a pressure valve member adapted to cooperate with a pressure valve seat to provide a variable pressure valve opening, a variable flow area valve connected in series with said throttling valve and receiving the outflow therefrom, means for obtaining the static atmospheric pressure, means for obtaining the atmospheric stagnation pressure, means for varying the effective flow area of said variable flow area valve in accordance with changes in atmospheric pressure, means applying a pressure proportional to the pressure drop occurring across the variable flow area valve to said pressure valve member, and means also applying the differential pressure between atmospheric pressure and stagnation pressure to said pressure valve member, thereby causing said valve member to assume a position balancing said pressure drop and said differential atmospheric and stagnation pressure whereby the pressure drop across said variable flow area valve is maintained proportional to said differential atmospheric and stagnation pressure and the flow through said variable flow area valve is maintained proportional to the product of said effective flow area and the square root of the difference between atmospheric stagnation and static pressure.

2. A fuel meter for maintaining a constant fuel-to-air ratio for a ramjet engine comprising, a fuel pressure throttling valve, including a pressure valve member having a valve stem and a valve seat, said pressure valve member being arranged to move with respect to said valve seat to provide a valve opening, means for applying stagnation pressure to the pressure valve member thereby tending to cause said pressure valve member to move in a first direction with respect to said valve seat, said first direction being such as to cause an increase in the outlet pressure of said pressure valve member, means for applying atmospheric pressure to the pressure valve member thereby tending to cause said pressure valve member to move in the opposite direction with respect to said valve seat, a variable area flow valve connected in series with said throttling valve, means for obtaining the atmospheric static pressure, means for obtaining the atmospheric stagnation pressure, means for varying the effective area of said variable flow area valve in accordance with changes in atmospheric pressure, a venturi connected to the output of said variable flow area valve, means applying the pressure occurring in the throat of said venturi to said pressure valve member to tend to cause movement of said pressure valve member in said first direction, and means applying the pressure occurring immediately ahead of said variable flow area valve to said pressure valve member to tend to cause movement of said pressure valve in said opposite direction, thereby causing said member to assume a position determined by an equilibrium between the difference in the pressure immediately ahead of said variable flow area valve and in the throat of said venturi and the difference between atmospheric pressure and stagnation pressure whereby a fixed relationship is maintained between said difference between atmospheric and stagnation pressure, the atmospheric pressure and the flow through said variable flow area valve.

3. A fuel meter for maintaining a constant fuel-to-air ratio for a ramjet engine comprising, a fuel pressure throttling valve receiving fuel and including a pressure valve member having a valve stem, a valve seat, and a piston, said piston being mounted on said valve stem in spaced relationship to said valve member, said valve member being arranged to move with respect to said valve seat to provide a valve opening, means for applying stagnation pressure to the valve member thereby causing said valve member to tend to move in a first direction with respect to said valve seat, said first direction being such as to cause an increase in the outlet pressure of said pressure valve member, means for obtaining atmospheric static pressure, means for obtaining atmospheric stagnation pressure, means for applying atmospheric pressure to the valve member thereby causing said valve member to tend to move in the opposite direction with respect to said valve seat, a variable flow area valve connected in series with said throttling valve and receiving the outflow therefrom, means for varying the effective area of said variable flow area valve in accordance with changes in atmospheric pressure, a venturi connected to the output of said variable flow area valve, means applying the fuel pressure at the input to said variable flow area valve to one surface of said piston, and means applying the fuel pressure in the throat of said venturi to the other surface of said piston, thereby causing said valve member to assume a position balancing the difference between the fuel pressure at the input to said variable flow area valve and the fuel pressure in the throat of said venturi against the difference between atmospheric pressure and stagnation pressure whereby a fixed relationship is maintained between said difference between atmospheric pressure and stagnation pressure and the flow through said variable area flow valve.

4. A fuel meter for maintaining a constant fuel-to-air ratio for a ramjet engine comprising, a fuel pressure throttling valve receiving fuel, said throttling valve including a pressure valve member having a valve stem, a valve seat, a piston mounted on said valve stem in spaced relationship to said valve member, a flexible diaphragm carried on one end portion of said valve stem and a second flexible diaphragm carried on the other end portion of said stem, said pressure valve member being arranged to move with respect to said valve seat to provide a valve opening, means for obtaining the atmospheric static pressure, means for obtaining the atmospheric stagnation pressure, means for applying stagnation pressure to the diaphragm carried on the said one end portion of said valve stem for causing said valve member to tend to move in an opening direction with respect to said valve seat, means for applying atmospheric pressure to the diaphragm mounted on said other end portion of said valve stem for causing the valve member to tend to move in a closing direction with respect to said valve seat, a variable flow area valve connected in series with said throttling valve and receiving the outflow therefrom, means for varying the effective area of said variable flow area valve in accordance with changes in atmospheric pressure, a venturi connected to the output of said variable flow area valve, means applying the fuel pressure at the input to said variable flow area valve to the surface of said piston tending to cause movement of said pressure valve member in a closing direction with respect to said valve seat, and means applying the fuel pressure in the throat of said venturi to the other surface of said piston, thereby causing said valve member to assume a position balancing the difference between the fuel pressure and the inlet to said variable flow area valve and the fuel pressure in the throat of said venturi against the difference between atmospheric pressure and stagnation pressure whereby a fixed relationship between said difference between atmospheric pressure and stagnation pressure and the flow through said variable flow area valve will be established.

5. A fuel meter for maintaining a constant fuel-to-air ratio for a ramjet engine comprising, a pressure throttling valve receiving fuel from a source and including a valve element for controlling the pressure of the outflow therefrom, means for obtaining the atmospheric stagnation pressure created by the motion of the engine, means for obtaining the ambient atmospheric static pressure, means applying said stagnation pressure to said valve element in a manner tending to increase said outflow pressure, means applying said static pressure to said valve element in a manner tending to decrease said outflow pressure, a variable flow area valve receiving the outflow from said pressure throttling valve and controlling the flow of fuel to the engine combustion means, means for controlling the flow area of said variable flow area valve in accordance with said static pressure, means applying said pressure valve outflow pressure to said pressure valve element for opposing the action thereon of said means applying stagnation pressure, and means applying a pressure proportional to the outlet pressure of said variable flow area valve to said pressure valve element for opposing the action thereon of said means applying static pressure, whereby the pressure drop across said variable flow area valve will be maintained proportional to the difference between said stagnation pressure and said static pressure and consequently, the flow to the engine combustion means will be maintained proportional to the product of the flow area of said variable flow area valve and the square root of the difference between said stagnation pressure and said static pressure.

6. A fuel meter as claimed in claim 5 wherein said means for controlling the flow area of said variable flow area valve comprises an evacuated expansible chamber, means applying said static pressure to said chamber, and means for communicating motion of said chamber to said variable flow area valve.

7. A fuel meter as claimed in claim 6 wherein said means applying a pressure proportional to the outlet pressure of said variable flow area valve includes a venturi.

References Cited in the file of this patent
UNITED STATES PATENTS

| | | |
|---|---|---|
| 2,303,640 | Hogg | Dec. 1, 1942 |
| 2,601,976 | Chandler | July 1, 1952 |
| 2,636,553 | Ballantyne et al. | Apr. 28, 1953 |
| 2,638,739 | Barr | May 19, 1953 |
| 2,705,046 | Schroeder | Mar. 29, 1955 |

OTHER REFERENCES

Article: "Pressure-Sensitive System For Gas Temperature Control" by Cesaro and Matz, N. A. C. A. Report 896, pages 99–105, March 4, 1948.